(12) United States Patent
Dilz, Jr.

(10) Patent No.: US 10,478,695 B2
(45) Date of Patent: Nov. 19, 2019

(54) INSTRUMENTED BATTING SYSTEM (71) Applicant: Sports Sensors, Inc., Cincinnati, OH (US)

(72) Inventor: Albert E. Dilz, Jr., Cincinnati, OH (US)

(73) Assignee: Sports Sensors, Inc., Cincinnati, OH (US)

( * ) Notice: Subject to any disclaimer, the term of this patent is extended or adjusted under 35 U.S.C. 154(b) by 0 days.

(21) Appl. No.: 16/008,106

(22) Filed: Jun. 14, 2018

(65) Prior Publication Data

US 2018/0290037 A1 Oct. 11, 2018

Related U.S. Application Data

(63) Continuation-in-part of application No. 15/645,210, filed on Jul. 10, 2017, now Pat. No. 10,071,296,
(Continued)

(51) Int. Cl.
*A63B 69/00* (2006.01)
*A63B 24/00* (2006.01)
(Continued)

(52) U.S. Cl.
CPC ...... *A63B 69/0002* (2013.01); *A63B 24/0021* (2013.01); *A63B 69/0075* (2013.01); *G01S 13/583* (2013.01); *G01S 13/88* (2013.01); *G09B 19/0038* (2013.01); *A63B 69/0091* (2013.01); *A63B 71/0622* (2013.01); *A63B 2069/0008* (2013.01); *A63B 2071/0658* (2013.01); *A63B 2208/0204* (2013.01); *A63B 2220/30* (2013.01);
(Continued)

(58) Field of Classification Search
CPC ........ A63B 2069/0008; A63B 69/0075; A63B 69/0091
USPC ......................................................... 473/417
See application file for complete search history.

(56) References Cited

U.S. PATENT DOCUMENTS 3,781,879 A 12/1973 Staras et al.
3,852,743 A 12/1974 Gupta
(Continued)

OTHER PUBLICATIONS

Adair, Robert K., "The Physics of Baseball," Physics Today, May 1995, pp. 26-31 (6 pages).
(Continued)

*Primary Examiner* — Mark S Graham
(74) *Attorney, Agent, or Firm* — Wood Herron & Evans LLP (57) ABSTRACT

An instrumented batting system measures a bat speed and an exit velocity as a batter swings a bat and initiates contact between the bat and a ball positioned on a batting tee assembly. The batting tee assembly includes a bat speed radar device and an exit velocity radar device each in communication with a computing device. The bat speed radar device emits a radar beam that intersects a swing plane of the batter in a direction generally toward an expected position of the batter. The exit velocity radar device emits another radar beam that intersects a flight path of the ball in another direction generally away from the expected position of the batter. The system determines the bat speed and exit velocity using the radar beams, calculates a batting metric based on the bat speed and exit velocity, and displays the swing metric using a computing device.

20 Claims, 8 Drawing Sheets

Related U.S. Application Data which is a continuation of application No. 14/797,753, filed on Jul. 13, 2015, now Pat. No. 9,700,777.

(51) Int. Cl.
*G09B 19/00* (2006.01)
*G01S 13/58* (2006.01)
*G01S 13/88* (2006.01)
*A63B 71/06* (2006.01)

(52) U.S. Cl.
CPC ....... *A63B 2220/89* (2013.01); *A63B 2225/09* (2013.01); *A63B 2225/093* (2013.01); *A63B 2225/50* (2013.01)

(56) References Cited

U.S. PATENT DOCUMENTS

| | | |
|---|---|---|
| 3,895,366 A | 7/1975 | Morris |
| 3,896,435 A | 7/1975 | Constant |
| 4,030,097 A | 6/1977 | Gedeon |
| 4,184,156 A | 1/1980 | Petrovsky et al. |
| 4,276,548 A | 6/1981 | Lutz |
| 4,509,052 A | 4/1985 | Cash |
| 4,759,219 A | 7/1988 | Cobb et al. |
| 4,801,880 A | 1/1989 | Koike |
| 4,834,375 A | 5/1989 | Elstein et al. |
| 4,915,384 A | 4/1990 | Bear |
| 5,092,602 A | 3/1992 | Witter et al. |
| 5,133,213 A | 7/1992 | Bernstein et al. |
| 5,199,705 A | 4/1993 | Jenkins et al. |
| 5,275,396 A | 1/1994 | Sudia |
| 5,315,306 A | 5/1994 | Doughty et al. |
| 5,401,026 A | 3/1995 | Eccher et al. |
| 5,419,549 A | 5/1995 | Galloway et al. |
| 5,471,405 A | 11/1995 | Marsh |
| 5,553,846 A | 9/1996 | Frye et al. |
| 5,570,094 A | 10/1996 | Armstrong |
| 5,697,791 A | 12/1997 | Nashner et al. |
| 5,723,786 A | 3/1998 | Klapman |
| 5,761,096 A | 6/1998 | Zakutin |
| 5,779,555 A | 7/1998 | Nomura et al. |
| 5,796,354 A | 8/1998 | Cartabiano et al. |
| 5,864,061 A | 1/1999 | Dilz, Jr. |
| 6,079,269 A | 6/2000 | Dilz, Jr. |
| 6,292,130 B1 | 9/2001 | Cavallaro et al. |
| 6,378,367 B1 | 4/2002 | Dilz, Jr. |
| 6,666,089 B2 | 12/2003 | Dilz, Jr. |
| 6,898,971 B2 | 5/2005 | Dilz, Jr. |
| 8,007,367 B2 | 8/2011 | Dilz, Jr. et al. |
| 8,574,101 B2 | 11/2013 | Wheelbarger et al. |
| 9,700,777 B2 | 7/2017 | Dilz, Jr. |
| 10,071,296 B2 * | 9/2018 | Dilz, Jr. ............. A63B 69/0002 |
| 2015/0065272 A1 | 3/2015 | Bond |
| 2015/0105187 A1 | 4/2015 | Willardson |

OTHER PUBLICATIONS

Nathan, Alan M., "Dynamics of the baseball-bat collision," Am. J. Phys. 68 (11), Nov. 2000, pp. 979-990 (12 pages).

Nathan, Alan M., "Characterizing the performance of baseball bats," Am. J. Phys. 71 (2), Feb. 2003, pp. 134-143 (10 pages).

* cited by examiner

INSTRUMENTED BATTING SYSTEM

RELATED APPLICATIONS

The present application is a Continuation-In-Part of U.S. application Ser. No. 15/645,210 filed on Jul. 10, 2016, which is a Continuation of U.S. application Ser. No. 14/797,753 filed on Jul. 13, 2015, the disclosures of which are incorporated by reference herein in their entireties.

BACKGROUND

The present invention generally relates to systems and methods of determining swing metrics that characterize the swing of a batter, and specifically to an instrumented batting system that measures the swing and displays the swing metrics to the batter.

An increasingly popular metric in measuring the effectiveness of a baseball or softball batter's swing is the velocity of the ball in-flight after contact with the bat. Greater exit velocity of the ball in-flight after contact with the bat is representative of the batter initiating contact with the ball with a greater portion of the bat, and with greater precision. A high exit velocity is thus representative of a more effective swing. In contrast, lower exit velocity is representative of the batter initiating contact with the ball with a lesser portion of the bat and with less precision, and is thus representative of a less effective swing.

Conventional methods in measuring exit velocity include using a radar device held by an operator in which the operator attempts to aim the radar device at the ball after it has been hit to measure the exit velocity as the ball travels away from the bat. However, the exit velocity decreases rapidly after the ball has been hit. Thus, the operator that attempts to measure the exit velocity of the ball in the above manner measures an exit velocity that is decreasing as the ball travels away from the batter. Such a measured exit velocity can be significantly less than the exit velocity of the ball immediately after the ball makes contact with the bat, resulting in an inaccurate assessment in the effectiveness of the batter's swing.

In addition, when the operator aims the radar device at the ball, the radar device may be at an angle relative to the flight path of the ball, which reduces the measured exit velocity. Rather than measuring the exit velocity, an angle between the radar device and the flight path of the ball results in the measured velocity being multiplied by the cosine of the angle between the radar beam and the flight path of the ball. This cosine effect can result in the measured exit velocity being significantly less than the actual exit velocity, which again results in an inaccurate assessment in the effectiveness of the batter's swing. Since the angle can be different from measurement to measurement, it can be difficult to take the angle into account in comparing or evaluating measurements without the use of a complex and expensive radar system.

Thus, there is a need for improved systems, methods, and computer program products that accurately determine swing metrics and display those metrics to the user.

SUMMARY

Embodiments of the invention are directed to systems and methods for detecting the speed of a bat and the exit velocity of a ball struck by the bat. One or more of the bat speed, exit velocity, or some other swing metric determined therefrom may then be displayed to a batter or coach. To determine bat speed and exit velocity, one speed measuring device (e.g., a radar device) may be used to measure the batter's swing speed, and another speed measuring device (e.g., another radar device) may be used to measure the ball exit velocity. Each of the radar devices may be optimized to detect a specific swing metric. Data collected by the speed measuring devices may be transmitted to a suitable computing device for processing and/or display to the user.

The above summary presents a simplified overview of some embodiments of the invention in order to provide a basic understanding of certain aspects of the invention described herein. The summary is not intended to provide an extensive overview of the invention, nor is it intended to identify any key or critical elements or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
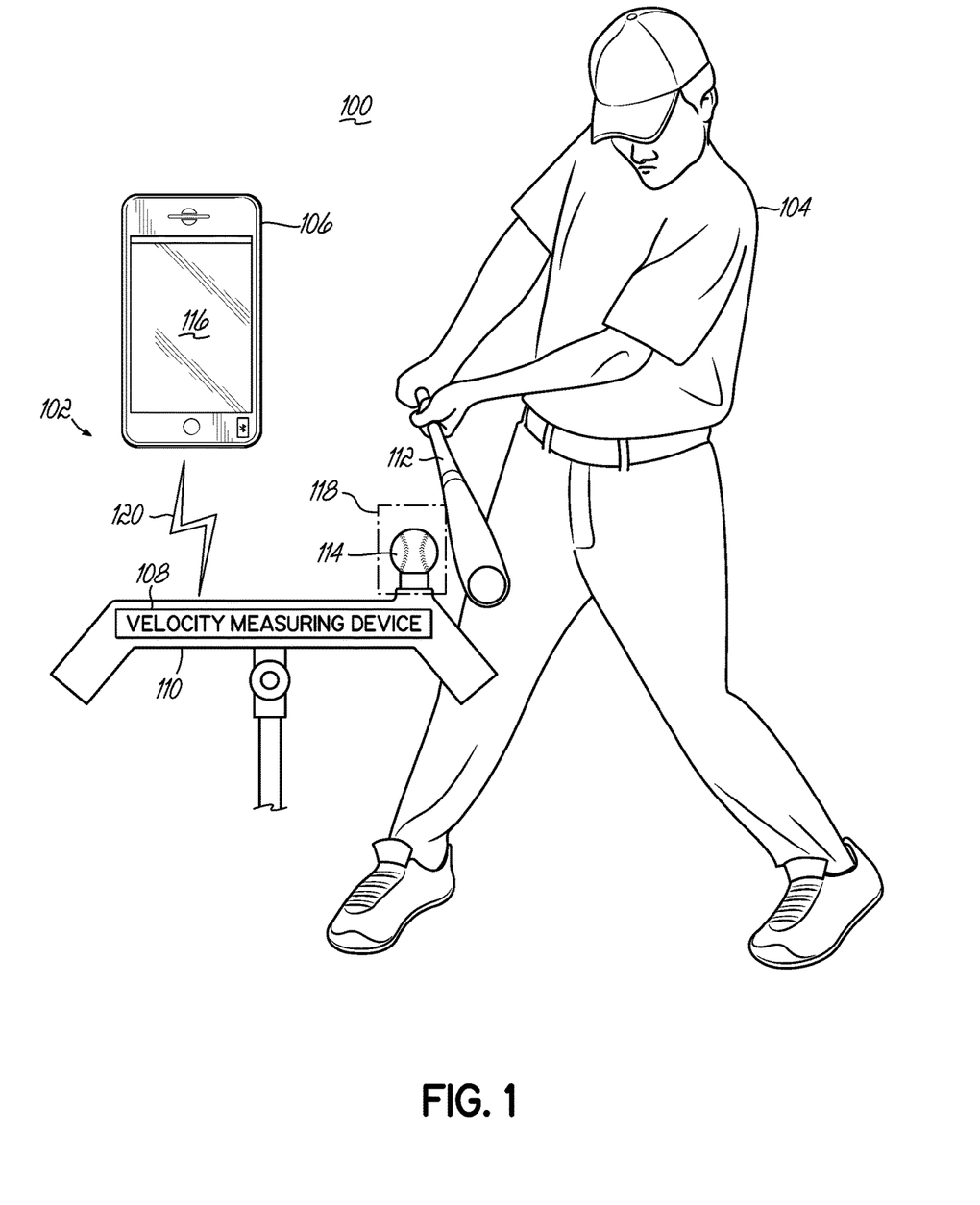
FIG. 1 is a diagrammatic view illustrating an exemplary operating environment for an instrumented batting system including a batting tee assembly having a velocity measuring device, and a computing device in communication with the velocity measuring device.

FIG. 1 illustrates an exemplary operating environment 100 for an instrumented batting system 102 in accordance with an embodiment of the invention. The instrumented batting system 102 may be used by a batter 104 to practice hitting a ball, such as a baseball or softball. The instrumented batting system 102 may measure the exit velocity of the ball and the speed of the bat, and display the exit velocity and bat speed measurements, as well as swing metrics calculated therefrom, to the batter 104, e.g., on a computing device 106. A velocity measuring device 108 may be included in a batting tee assembly 110 to measure both the bat speed, which is the velocity of the bat 112 as the bat 112 makes initial contact with a ball 114, and the exit velocity, which is the velocity of the ball 114 in-flight when batter 104 has completed contact between the ball 114 and the bat 112.

The bat speed and exit velocity may then be displayed by a display 116 of computing device 106.

The batting tee assembly 110 may include a stationary tee which the batter 104 adjusts so that the batter 104 can position the ball 114 in a stationary position on the batting tee assembly 110 within a hitting zone 118. The batter may then swing the bat 112 into the ball 114 to practice, teach, correct and/or reinforce the mechanics of their swing. The batting tee assembly 110 may be positioned on the ground and adjusted to a desired height such that the batting tee assembly 110 simulates the various locations of a pitched ball 114 as seen by the batter 104. The batting tee assembly 110 may be adjusted for both a left-handed batter and a right-handed batter.

For example, the batter 104 may position the batting tee assembly 110 at a desired position and height so that the ball 114 is positioned in the middle of a hitting zone 118 of the batter 104 so that the batter may practice hitting the ball 114 up through the middle of the ball field. The batter 104, after each swing, positions the ball 114 once again on the batting tee assembly 110 and then repetitiously continues to hit the ball 114 up through the middle of the ball field, thereby perfecting the mechanics of their a swing.

The batting tee assembly 110 may be used to provide feedback to the batter 104 regarding the quality of each swing so that the batter's swing can be continually improved based on the feedback. For example, visual feedback is provided each time the batter 104 completes a swing by the flight path of the ball 114. The batter 104 may be able to observe the quality of the swing based on whether the flight path of the ball 114 satisfied their expectations. The batter 104 may determine their mechanics were correct when the flight path of the ball 114 satisfies their expectations, or determine their mechanics were deficient when the flight path fails to satisfy their expectations. In addition to visual feedback, the batting tee assembly 110 may provide swing metrics that provide feedback regarding the quality of the swing. These swing metrics may include the bat speed and exit velocity measured by the batting tee assembly 110, and/or additional swing metrics determined from the bat speed and/or exit velocity.

Bat speed is the velocity of the bat 112 achieved at the point of contact with the ball 114 when the batter 104 swings the bat 112 from a resting position and thrusts the bat 112 through the hitting zone 118. The velocity of the bat 112 upon initiating contact with the ball 114 may have a direct effect on the exit velocity and the distance that the ball 114 travels. Greater exit velocities and distances may be indicative of a high-quality swing being executed by the batter 104. Thus, the greater the bat speed, the greater the likelihood that the ball 114 will be propelled off the bat 112 with a high exit velocity and travel a distance representative of a high-quality swing.

Exit velocity refers to the exit velocity of the ball 114 in-flight immediately upon leaving the bat 112 after the bat 112 makes contact with the ball 114. The exit velocity may be an indication of not only bat speed as discussed above, but also of the precision with which the batter 104 causes the bat 112 to initiate contact with the ball 114. The exit velocity may provide an indication of how efficiently the kinetic energy produced by the speed of the bat 112 is transferred into the ball 114. For example, exit velocity may provide an indication of how much of the surface area of the bat 112 made contact with the ball 114, the location on the ball 114 where contact was made by the bat 112, and how well the batter 104 drove through the ball 114 after making contact.

The velocity measuring device 108 may measure both the bat speed and the exit velocity as the batter 104 swings the bat 112 and initiates contact with the ball 114. The velocity measuring device 108 may include one or more radar devices configured to measure the bat speed and the exit velocity associated with the swing of the batter 104. Each of the one or more radar devices may include a transmitter that transmits an electromagnetic signal (e.g., a microwave signal) and a receiver or other sensors that detect frequency shifts (i.e., Doppler shifts) in a received electromagnetic signal reflected off the bat 112 and/or ball 114 (i.e., the return signal). In an alternative embodiment of the invention, the velocity measuring device may include one or more of a piezoelectric device, visual average speed computer and recorder (VASCAR), light detection and ranging (LIDAR), and/or any other type of devices that may be used to detect the exit velocity and bat speed.

In an embodiment of the invention, one radar device may be used to measure the bat speed, and another radar device may be used to measure the exit velocity. To this end, a respective one of the radar devices may be arranged to measure the velocity of the ball in flight in sufficiently close proximity to the point at which the ball has completed contact with the bat so that the velocity of the ball has not significantly decreased from the initial exit velocity. The velocity measuring device 108 may determine the bat speed from measurements captured by the respective one of the radar devices and the exit velocity from the measurements captured by another of the radar devices. In another embodiment of the invention, several radar devices may be used to measure one or more of the bat speed and/or exit velocity.

The batter 104 may initiate a swing from an initial position at which the bat 112 has an initial velocity of zero mph. The velocity of the bat 112 increases as the batter 104 swings the bat 112 through the hitting zone 118 and toward the ball 114 positioned on the batting tee assembly 110. The one or more radar devices positioned in the velocity measuring device 108 may then measure the bat speed as the bat 112 initiates contact with the ball 114 as well as the exit velocity of the ball in-flight after the bat 112 has made contact with the ball 114.

The velocity measuring device 108 may determine the bat speed and the exit velocity so that the bat speed and the exit velocity provide adequate feedback to the batter 104. This may allow the batter 104 to objectively assess the quality of their swing. Greater bat speed and greater exit velocity may indicate a higher quality swing. A greater bat speed may provide the batter 104 with a higher probability that they will strike the ball 114 in a way that produces a high exit velocity, thereby resulting in the batter 104 driving the ball 114 a satisfactory distance. The positions and orientations of the one or more radar devices in the velocity measuring device 108 may be configured so that the devices measure the exit velocity of the ball 114 in-flight after the bat 112 initiates contact with the ball 114, and to substantially eliminate any effects of decreases in the exit velocity as the ball 114 travels away from the batter 104 on the exit velocity measurement.

The velocity of the ball 114 tends to decreases as the ball travels away from the batter 104. For this reason, exit velocity measurements that occur after the ball 114 has traveled a significant distance from the batter 104 may result in a decreased velocity measurement as compared to the exit velocity of the ball 114 immediately following contact with the bat 112. In this case, a low velocity measurement may be the result of the velocity decreasing in flight rather than a poor swing. The position of at least one of the radar devices in the batting tee assembly 110 may be selected so that the radar device measures the exit velocity of the ball 114 near the beginning of its flight path. This positioning may provide a more accurate assessment of the swing executed by the batter 104 than other positions within the batting tee assembly 110. The velocity measuring device 108 may measure the bat speed alone, the exit velocity alone, or both the bat speed and the exit velocity during a swing of the bat 112.

The velocity measuring device 108 may transmit the measured bat speed and the exit velocity to the computing device 106 via a communications signal 120. The computing device 106 may then display the measured bat speed, exit velocity, and/or additional swing metrics calculated from the bat speed and/or exit velocity to the batter 104 via the display 116. The computing device 106 may be capable of electronically communicating with the velocity measuring device 108 and other devices using a communications protocol such as Bluetooth, Wi-Fi, or any other suitable communications protocol. Exemplary computing devices 106 may include a mobile phone, a smartphone, a workstation, a portable computing device such as a laptop or tablet computer, a desktop computer, cluster of computers, a computer peripheral such as a printer, a portable audio and/or video player, and/or any other suitable electronic device that may be used to display information to the batter 104.

The velocity measuring device 108 may transmit both the bat speed and the exit velocity to the computing device 106 via the communications signal 120. The computing device 106 may display the bat speed, the exit velocity, or other batting metrics to the batter 104 simultaneously via the display 116. The batter 104 may then obtain immediate feedback with regard to the execution of their swing based on the one or more batting metrics displayed by the computing device 106. After the batter 104 has assessed the swing based on the flight of the ball 114, the batter 104 may complement the visual feedback provided by the flight of the ball 114 with the swing metrics displayed by the display 116.

For example, the batter 104 observes that the ball 114 travelled in the direction that the batter 104 had desired to hit the ball 114 based on the positioning of the batting tee assembly 110 relative to the batter 104, and that the flight path of the ball 114 followed that of a line drive. Such visual feedback indicates that the batter 104 executed a high-quality swing. The batter 104 may then complement that visual feedback by viewing the swing metrics of the executed swing as displayed by the display 116. Good swing metrics may reinforce the batter's assessment of the swing as being a high-quality swing.

Figure 2:
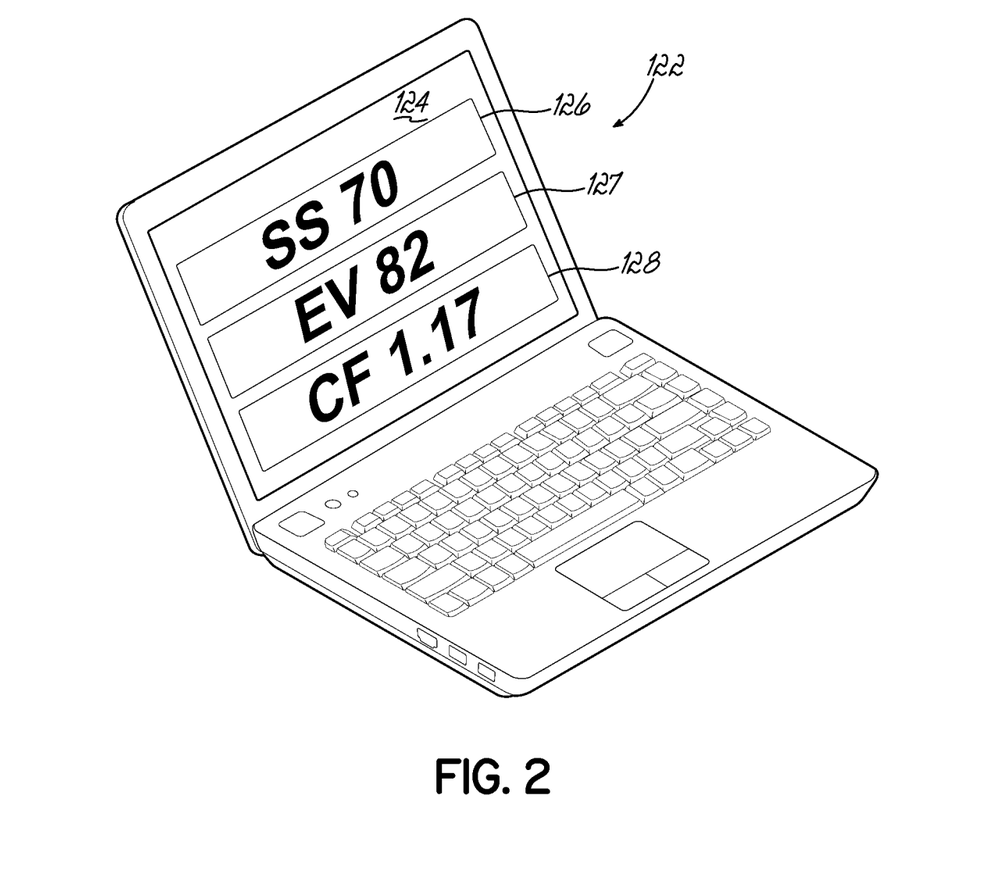
FIG. 2 is a perspective view of an exemplary computing device of FIG. 1.

Referring now to FIG. 2, an exemplary computing device 106 may include a laptop computer 122 including a screen 124. An application running on the laptop computer 122 may receive the communications signal 120, extract the bat speed and exit velocity embedded in the communications signal 120, and either sequentially or simultaneously (as shown) cause the screen 124 of laptop computer 122 to display the bat speed, the exit velocity, and/or one or more additional swing metrics. Additional swing metrics may be calculated, for example, using one or more of the bat speed and exit velocity. These metrics may be displayed simultaneously, for example, using one or more windows 126-128.

The combinations of one or more swing metrics that are displayed by the computing device 106 may be user selectable. For example, a system user may select which metrics are displayed and how they are displayed through a user interface of the application, which may be a custom application loaded onto the computing device 106. Swing metrics may also be displayed sequentially or simultaneously by one or more displays 116 of one or more computing devices 106. For example, several computing devices 106 may be used, with each device displaying a different swing metric. Thus, it should be understood that embodiments of the invention are not limited to displaying any specific sequence, order, or number of swing metrics, or on any specific number of computing devices 106.

Coaches and instructors who teach hitting can intuitively identify the elements of a batter's swing that are most likely to produce well hit balls. One of these elements is bat speed, since a faster bat speed tends to produce a higher exit velocity. However, conventional swing analysis systems fail to capture certain aspects of the swing that contribute to well-hit balls, but which elude quantification. One such aspect is how efficient the batter is at transferring the kinetic energy of the bat 112 into the ball 114. This swing metric is referred to as a "conversion factor" $C_F$. Energy transfer to the ball can be affected by a number of things, including an undesirable transfer of some of the bat's kinetic energy into the player's body, if the ball is not struck with optimum mechanics. The present invention may calculate the conversion factor $C_F$ using the bat speed $B_S$ and exit velocity $E_V$ based on the following equation:

$$C_F = \frac{E_V}{B_S} \qquad \text{(Eqn. 1)}$$

This conversion factor $C_F$ may be displayed to the batter to provide them with an objective measure of their swing efficiency. The maximum conversion factor $C_F$ for a ball and bat that comply with the Bat-Ball Coefficient of Restitution (BBCOR) standard currently governing adult baseball bats used in most high school, collegiate, and professional play is a conversion factor $C_F \approx 1.2$.

Equation 1 can be derived from the following equation for calculating the exit velocity of a pitched ball:

$$E_V = Q \times P_S + C_F \times B_S \qquad \text{(Eqn. 2)}$$

where Q is a collision factor of a well stuck ball from an efficient swing, and $P_S$ is the pitched ball speed. Equipment that complies with BBCOR standards cannot have Q greater than 0.2. In any case, for a ball hit off a tee, $P_S=0$. Thus, Equation 2 can be simplified and solved for the conversion factor $C_F$ to produce Equation 1 for balls hit off a tee.

Figure 3:
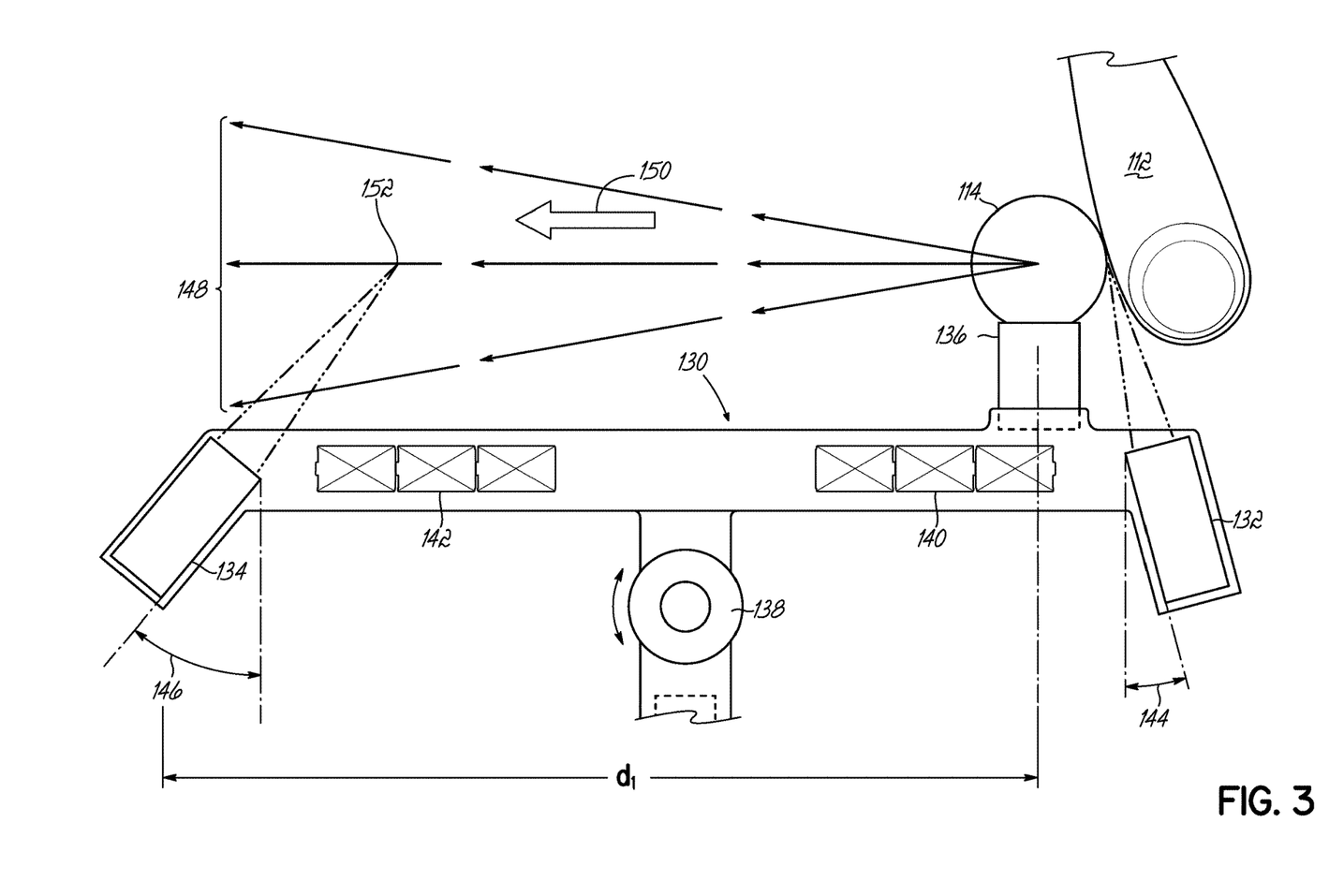
FIG. 3 is a diagrammatic view showing a batting tee assembly in accordance with an embodiment of the invention.

FIG. 3 depicts a batting tee assembly 130 according to an exemplary embodiment of the invention. The batting tee assembly 130 may include a bat speed radar device 132, an exit velocity radar device 134, a ball rest 136, an angle adjuster 138, a power supply 140 that provides power to the bat speed radar device 132, and a power supply 142 that provides power to the exit velocity radar device 134. In an embodiment of the invention, each of the radar devices 132, 134 may include electrical circuitry comprising a radar signal source and a radar signal receiver that are coupled to one or more antennas or other radiating elements. The antennas or other radiating elements may provide a point of emission from which the transmitted signal is emitted, and/or a point of reception at which a return signal is received.

The bat speed radar device 132 may be configured to measure bat speed as the bat 112 initiates contact with the ball 114. The exit velocity radar device 134 may be configured to measure the exit velocity of the ball 114 shortly after the bat 112 has made contact with the ball 114. To this end, the exit velocity radar device 134 may be located a distance $d_1$ of between 22 and 34 inches (e.g., about 28 inches) from where the ball 114 is positioned on the ball rest 136. The distance $d_1$ may be selected so that it is sufficient to prevent the exit velocity radar device 134 from detecting the bat 112 as the bat 112 passes through the hitting zone 118 and strikes the ball 114. The distance $d_1$ may be further selected so that the exit velocity radar device 134 measures the exit velocity of the ball 114 before the velocity of the ball begins to decrease significantly due to aerodynamic drag or other effects during the flight of the ball 114.

The batting tee assembly 130 may be further configured so that the bat speed radar device 132 is oriented at an angle 144 relative to batting tee assembly 130 that causes a radar beam emitted by the radar device 132 to capture the speed of the bat 112 at a point where the bat 112 has essentially achieved the bat speed at which the ball 114 is struck. The exit velocity radar device 134 may be oriented at an angle 146 relative to the batting tee assembly 130 to capture the speed of the ball 114 at a point after the ball 114 has been struck, but before the velocity of the ball has decreased significantly.

The batter 104 may position the ball 114 on the ball rest 136 before swinging the bat 112 at the ball 114. The batter 104 may be a right-handed batter or a left-handed batter. At least a portion of the ball rest 136 may be comprised of a flexible material such that, when the batter 104 swings the bat 112, any contact between the bat 112 and the ball rest 136 is absorbed by the ball rest 136 with minimal energy transfer or friction between the bat 112 and the ball rest 136. Minimizing friction between the ball rest 136 and the bat 112 may minimize the amount of deceleration experienced by the bat 112 as the batter 104 swings at the ball 114. The ball rest 136 may be removable to facilitate replacement if the ball rest 136 becomes worn and is no longer in a condition to adequately support the ball 114.

The bat speed radar device 132 may be positioned below the ball rest 136 and coupled to the batting tee assembly 130. The bat speed radar device 132 may be positioned such that a velocity detector portion of the bat speed radar device 132 is facing upwards towards the ball rest 136 and aimed to where the ball 114 is positioned on the ball rest 136. The bat speed radar device 132 may be positioned within proximity of the ball 114 positioned on the ball rest 136 such that the bat speed radar device 132 may detect the bat 112 as the bat 112 initiates contact with the ball 114 and measure the bat speed.

In response to the bat 112 forcefully contacting the ball 114, the ball 114 may be propelled into a flight path 148, which is the trajectory of the ball 114 after the batter 104 swings and hits the ball 114. The exit velocity radar device 134 may positioned the distance $d_1$ from the ball rest 136 generally in line with the expected flight path 148 of a well-struck ball 114.

Detection of the bat 112 travelling by the exit velocity radar device 134 has the potential to skew the exit velocity measurement. The exit velocity radar device 134 may have difficulty distinguishing the exit velocity of the ball 114 as the ball 114 travels along the flight path 148 from the bat speed of the bat 112 as the bat 112 travels through the hitting zone 118 and past the ball rest 136. Positioning the exit velocity radar device 134 a sufficient distance away from the ball rest 136 may reduce the likelihood that the bat 112 will affect the measured exit velocity of the ball 114. Additionally, the distance $d_1$ may be selected to be sufficiently short so that when the ball 114 travels along the flight path 148, the exit velocity radar device 134 measures the exit velocity before the exit velocity has decrease significantly from travel along the flight path 148. Positioning the exit velocity radar device 134 so that it measures ball velocity in flight while the ball is still over the batting tee assembly 130, for example, may result in the exit velocity being measured with sufficient accuracy.

The exit velocity radar device 134 may be positioned below the flight path 148 of the ball 114 and coupled to the batting tee assembly 130. The exit velocity radar device 134 may be positioned such that a velocity detector portion of the exit velocity radar device 134 is facing upwards and aimed towards the flight path 148 of the ball 114. The exit velocity radar device 134 may be positioned within proximity of the flight path 148 of the ball 114 such that the exit velocity radar device 134 detects the ball 114 as the ball 114 travels along the flight path 148 to measure the exit velocity of the ball 114. The velocity measuring device 108 may be calibrated to accurately report the exit velocity in response to the signal from the exit velocity radar device 134.

In an embodiment of the invention, a calibration process may be used to determine one or more correction factors. These correction factors may be used to correct the measured exit velocity so that it more closely represents the velocity of the ball 114 immediately after contact with the bat 112. For example, a corrected exit velocity $E_{VC}$ may be computed from the measured exit velocity $E_{VM}$ using the following equation:

$$E_{VC} = a \times E_{VM} + b \qquad \text{(Eqn. 3)}$$

where a and b are correction factors having values selected to compensate for measurement errors due to changes in velocity from air resistance, gravity, angular effects (e.g., the cosine effect), or any other predicted, measured, or otherwise determined measurement errors.

The bat speed radar device 132 may be positioned at or below a swing plane of the batter 104. The swing plane is the path over which the bat 112 travels as the batter 104 swings the bat 112 at a ball 114 positioned on the ball rest 136. The swing plane may be a generally two-dimensional shape defined by the path of the bat 112 as it moves from the initial pre-swing position until a certain amount of time after the batter 104 has made contact with the ball 114. That is, the swing plane may include a follow-through portion of the swing.

The bat speed radar device 132 may be positioned at an angle relative to the swing plane of the batter 104 such that the bat speed radar device 132 will produce a measurement that is representative of the speed of the bat 112 as it initiates contact with the ball 114. The velocity measuring device 108 may be calibrated to accurately report the exit velocity in response to the signal from the bat speed radar device 132 in a similar manner as described above with respect to the exit velocity radar device 134.

The exit velocity radar device 134 may be positioned at an angle relative to an exit velocity vector 150 associated with the flight path 148 of the ball 114. The exit velocity vector 150 may be the expected or average exit velocity vector of a well struck ball 114 after the bat 112 initiates contact with the ball 114. Thus, the direction of the exit velocity vector 150 corresponds to the direction of motion of a well struck ball 114 at the beginning of its flight path 148. The exit velocity radar device 134 may be positioned at an angle relative to the exit velocity vector 150 so that the exit velocity radar device 134 is aligned with a location 152 in the expected flight path 148. The location 152 may be the point at which the magnitude of the exit velocity vector 150 is captured by the exit velocity radar device 134 as the ball 114 travels along the flight path 148.

The bat speed radar device 132 may be powered by power supply 140, and the exit velocity radar device 134 may be powered by power supply 142 so that the radar devices 140, 142 are electrically independent. In an alternative embodiment, the radar devices 132, 134 may be powered by a single power supply. The power supplies 140, 142 may include any suitable source of power, such as a battery comprising one or more C-sized battery cells or a power converter that is coupled to the power grid, for example.

The angle adjuster 138 may be used to adjust the angle of the batting tee assembly 130 with respect to a horizontal plane, e.g., the ground. The angle may be selected so that the ball 114 is oriented correctly within the swing plane of the batter 104. The swing plane of the batter 104 may not necessarily be parallel to the horizontal plane as the bat 112 initiates contact with the ball 114 positioned on the ball rest 136. Rather, the swing plane may be at an angle relative to the horizontal plane.

Positioning the batting tee assembly 110 such that the ball rest 136 is perpendicular to the ground may require the swing plane be parallel to the ground when the bat 112 initiates contact with the ball 114 to maximize the surface area of the bat 112 that engages the ball 114. Maximizing the amount of surface area of the bat 112 that engages the ball 114 may result in a maximum transfer of energy from the bat 112 into the ball 114, resulting in greater exit velocity.

A batter 104 with a swing plane at an angle such that the bat 112 is not parallel to the ground when initiating contact with the ball 114 may result in an inaccurate velocity measurement when measured by a radar unit positioned to measure motion parallel to the ground. Advantageously, because the radar devices 132, 134 are coupled to the batting tee assembly 130, embodiments of the invention having the angle adjuster 138 may accommodate different swing plane angles while maintaining a consistent orientation of the radar devices with respect to both the swing plane and the exit velocity vector 150.

In an embodiment of the invention, the angle adjuster 138 may display the angle to which the batting tee assembly 130 has been adjusted. The batting tee assembly 130 may be locked at the selected angle setting. A light source, such as a low power light emitting diode (LED), may be built into the batting tee assembly 130 to illuminate a grid or other marking that provides an indication of the elevation and azimuth angle of the tee setting as well as the location of the ball 114 after initiating contact with the bat 112 relative to the angle setting of the angle adjuster 138.

Figure 4:
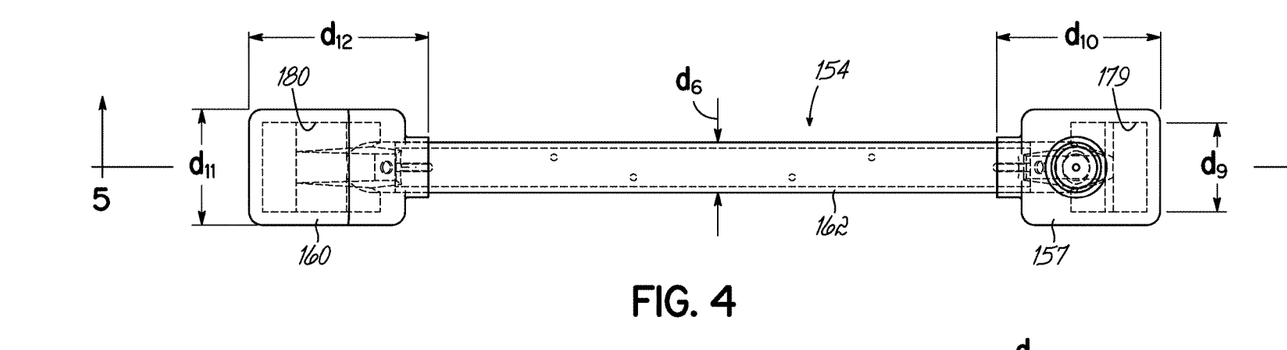
FIGS. 4 and 5 are cross-sectional views showing a batting tee assembly in accordance with another embodiment of the invention.
Figure 5:
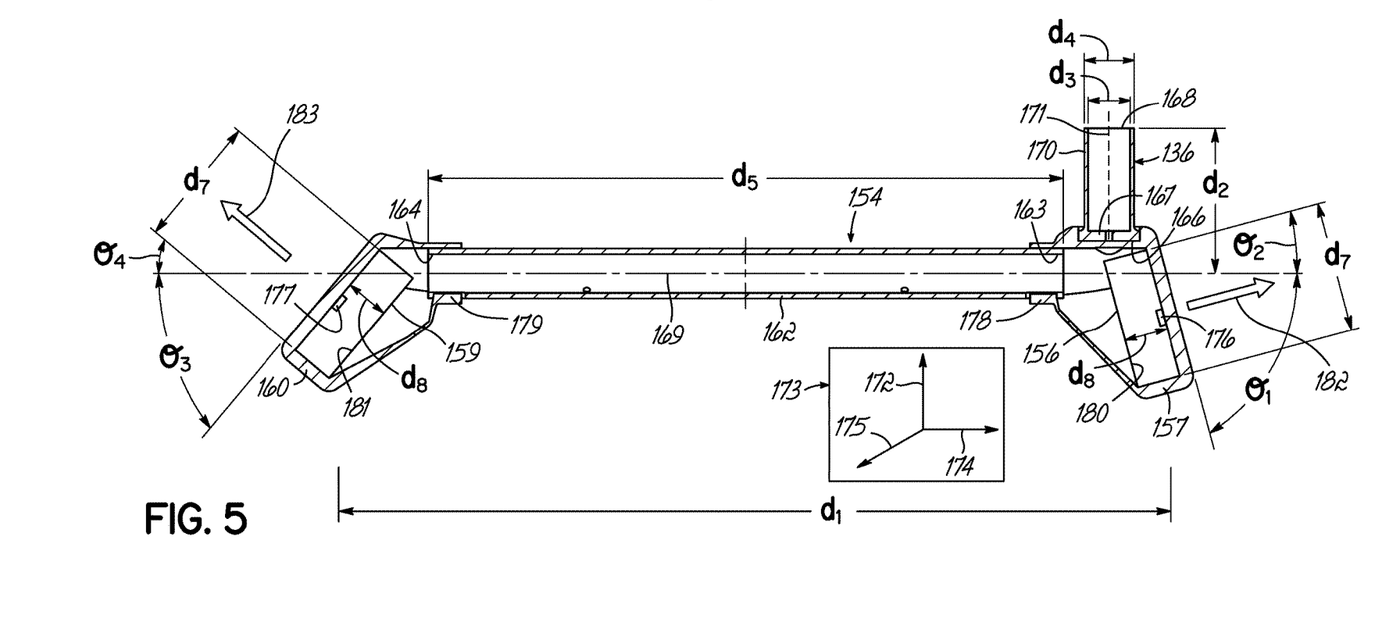

FIGS. 4 and 5 depict a batting tee assembly 154 in accordance with an embodiment of the invention that includes a bat speed radar device 156 located in a bat speed radar housing 157, an exit velocity radar device 159 located in an exit velocity radar housing 160, and a connecting member 162 having a proximal end 163 and a distal end 164. Each of the radar housings 157, 160 may be made from a material that is resilient to impacts from balls and bats as well as transparent to radar signals, such as urethane. The bat speed radar housing 157 may include a receptacle 166 configured to receive a lower portion 167 of the ball rest 136 so that the ball rest 136 is removably coupled to the bat speed radar housing 157. The ball rest 136 may have a length such that a top surface 168 of the ball rest 136 is a distance $d_2$ of between 4.4 and 6.6 inches (e.g., about 5.46 inches) above a centerline 169 of connecting member 162. The ball rest 136 may further include a cylindrically shaped upper portion 170 having an open top the circumference of which defines the top surface 168 of ball rest 136, and that is configured to hold the ball 114 in a stationary position. The upper portion 170 of ball rest 136 may have an interior diameter $d_3$ between 1.3 and 1.9 inches (e.g., about 1.59 inches), an outer diameter $d_4$ of between 1.5 and 2.3 inches (e.g., about 1.88 inches).

A centerline 171 of the ball rest 136 may be generally coincident with a vertical axis 172 of a three-dimensional coordinate system 173. The vertical axis 172 in turn, may be orthogonal to a horizontal axis 174 of coordinate system 173 which is generally coincident with the centerline 169 of connecting member 162. A lateral axis 175 orthogonal to each of the vertical and horizontal axes 172, 174 may intersect the vertical and horizontal axes 172, 174 at an origin of coordinate system 173. The horizontal, vertical, and lateral axes 172, 174, 175 of coordinate system 173 may be referred to herein to describe the relative positions and orientations of the components of the batting tee assembly 154.

The connecting member 162 may comprise a tube having a length $d_5$ of between 19 and 29 inches (e.g., about 24 inches) such that an emission point 176 of bat speed radar device 156 is horizontally offset from an emission point 177 of exit velocity radar device 159 by the distance $d_1$ when each of the housings 157, 160 are coupled to the connecting member 162. The radar devices 156, 159 may be positioned so that a line connecting the emission points 176, 177 is generally parallel to the horizontal axis 174. The line connecting the emission points 176, 177 may be considered as generally parallel to the horizontal axis 174 when the majority of the scalar distance between the emission points 176, 177 in the three-dimensional space defined by the coordinate system 173 is provided by the horizontal offset between the radar devices 156, 159 along the horizontal axis 174.

The bat speed radar housing 157 may include a flange 178 configured to receive the proximal end 163 of connecting member 162, and the exit velocity radar housing 160 may include flange 179 configured to receive the distal end 164 of connecting member 162. Each of the flanges 178, 179 may include an opening that couples the respective end 163, 164 of the connecting member 162 to an interior cavity of the respective housing 157, 160. An outer surface of connecting member 162 and an inner surface of the flanges 178, 179 may have a diameter $d_6$ of between 1.6 and 2.2 inches (e.g., of about 1.89 inches) that provides a friction fit between the connecting member 162 and the flanges 178, 179. The openings of flanges 178, 179 may provide a passage through which the radar devices 156, 159 can be electrically coupled to their respective power supplies 140, 142, e.g., using wires or other suitable conductors. To secure the housings 157, 160 to the respective ends 163, 164 of connecting member 162, hose clamps (not shown) or other suitable devices may be used to urge the interior service of the flanges 178, 179 against the corresponding outer surface of connecting member 162.

Each of the radar devices 156, 159 may include an enclosure 180, 181 that contains at least a portion of the electrical circuitry of the radar device 156, 159. Each enclosure 180, 181 may have a length $d_7$ of between 4.4 and 5.6 inches (e.g., about 4.93 inches), a depth $d_8$ of between 1.2 and 2.2 inches (e.g., about 1.66 inches), and a width $d_9$ of between 2.7 and 3.9 inches (e.g., about 3.38 inches). Each enclosure 180, 181 may be made of a conductive material, such as aluminum or copper, so that the interior cavity formed by the enclosure 180, 181 provides a resonant cavity that increases the output of the radar devices 156, 159 as compared to radar devices lacking this feature. The above dimensions may be for a radar device operating in a frequency range of 8.0 to 12.0 GHz (i.e., X-band), and may be scaled for radar devices operating at other frequencies.

Each enclosure 180, 181 may include an opening (e.g., a slot) configured to allow radar beams each having a respective radar vector 182, 183 to be transmitted from the respective radar devices 156, 159. The openings may also define the respective emission points 176, 177 for each of the radar devices 156, 159. In an embodiment of the invention, the radar beams may have beam-widths of between 10 and 30 degrees (e.g., about 20 degrees), and may have the same beam-width or different beam-widths.

The bat speed radar housing 157 may have a length $d_{10}$ of between 4.9 and 7.4 inches (e.g., of about 6.16 inches), a width $d_{11}$ of between 3.5 and 5.3 inches (e.g., about 4.38 inches), and a front surface oriented at an angle $\theta_1$ of between 60 and 90 degrees (e.g., about 75 degrees) to the horizontal axis 174. This angle may result in the radar vector 182 of bat speed radar device 156 having an angle of emission $\theta_2$ of between 0 and 30 degrees (e.g., about 15 degrees) above the horizontal axis 174, and that is generally directed toward an expected position of the batter 104. The bat speed radar device 156 may be offset vertically from the ball rest 136 so that the emission point 176 is generally below the swing plane of the bat 112. The bat speed radar device 156 may also be offset horizontally from the vertical and lateral axes 172, 175 toward the expected position of batter so that the emission point 176 is generally forward of the ball rest 136.

The exit velocity radar housing 160 may have a width of between 3.5 and 5.3 inches (e.g., about 4.38 inches), a length $d_{12}$ of between 5.4 and 8.1 inches (e.g., about 6.76 inches), and a front surface oriented at an angle $\theta_3$ of between 35 and 65 degrees (e.g., about 50 degrees) to the horizontal axis 174. This angle may result in the radar vector 183 of exit velocity radar device 159 having an angle of emission $\theta_4$ that is between 25 and 55 degrees (e.g., about 40 degrees) above the horizontal axis 174, and that is generally directed away from the expected position of batter 104.

The velocity of a ball can be defined with respect to the radar device in terms of a radial component and a lateral component. The radial component is the rate of change in the distance between the radar device and the ball along a line of sight between the radar device and the ball. The lateral component is the velocity component that causes an angular shift in the line of sight. Doppler radar only detects the radial component of an object's velocity. Thus, to achieve an accurate exit velocity measurement, the radar vector of the radar beam must be aligned with the velocity vector of the moving object. That is, the object being measured must be travelling directly toward or away from the radar device. Any misalignment creates an angle, which results in the radial velocity measured by the radar device being reduced by the cosine of the angle between the radar vector and the velocity vector. Since the batted ball can exit the bat in virtually any trajectory angle, mis-alignments are difficult to control.

The mis-alignment between the velocity vector and the radar vector tends to decrease as the ball travels away from the radar device. However, if the exit velocity radar is directed away from the batted ball in order to align the radar vector with the velocity vector of the ball at a distance, aerodynamic drag on the ball can begin to affect the measurement. It has been determined that the velocity of a batted ball is reduced by approximately one mile per hour for every seven feet of travel. This is a nominal value that can vary depending on environmental effects such as temperature, humidity, altitude, air density, etc. Thus, attempting to track the velocity of the ball at a distance may introduce another inaccuracy into the exit velocity measurement. These inaccuracies are inherent in conventional radar devices used to measure bat swing speed and ball exit velocity.

For example, in conventional systems, users typically attempt to align the radar vector with the ball velocity vector by placing the radar device behind the batter. In this scenario, speed readings may be obtained from the ball after it has travelled 20 to 50 feet from the striking position. As an example, suppose a batter as a swing speed of 70 miles per hour and a relatively efficient conversion factor $C_F$ of 1.17. This should produce an exit velocity of approximately 82 miles per hour off the tee. However, if two miles per hour are lost due to the cosine effect, and another five miles per hour due to in-flight deceleration, the resulting exit velocity measurement would be only 75 miles per hour. This would produce a conversion factor $C_F$ of only 1.07. This erroneous value could cause the batter or batting instructor to shift their focus to changes in the batter's swing that are unnecessary or even detrimental to the batter. Inconsistencies in how the equipment is set up and measurements are made can introduce variances in measured data between batting sessions, further affecting the integrity of data collected on the batter.

Embodiments of the invention overcome these problems by using separate radar devices that are each optimized to consistently detect a particular batting metric. The radar devices are both physically separated and electronically shielded to prevent the radar signals from interfering with each other. Furthermore, the radar beams are directed toward the swinging bat and the ball exit trajectory at angles that prevent radar signals reflected off the swinging bat from affecting the exit velocity measurement, and radar signals reflecting off the ball from affecting bat speed measurements. Thus, the unique dimensions, orientations, and locations of the radar devices relative to the ball rest and expected flight path of the batted ball each contribute to an improvement in accuracy of embodiments of the invention over conventional systems. Still further, the configuration of the batting tee assembly may also keep any remaining errors due to cosine and aerodynamic effects consistent between struck balls so that they can be compensated for by the above described calibration processes.

Figure 6:
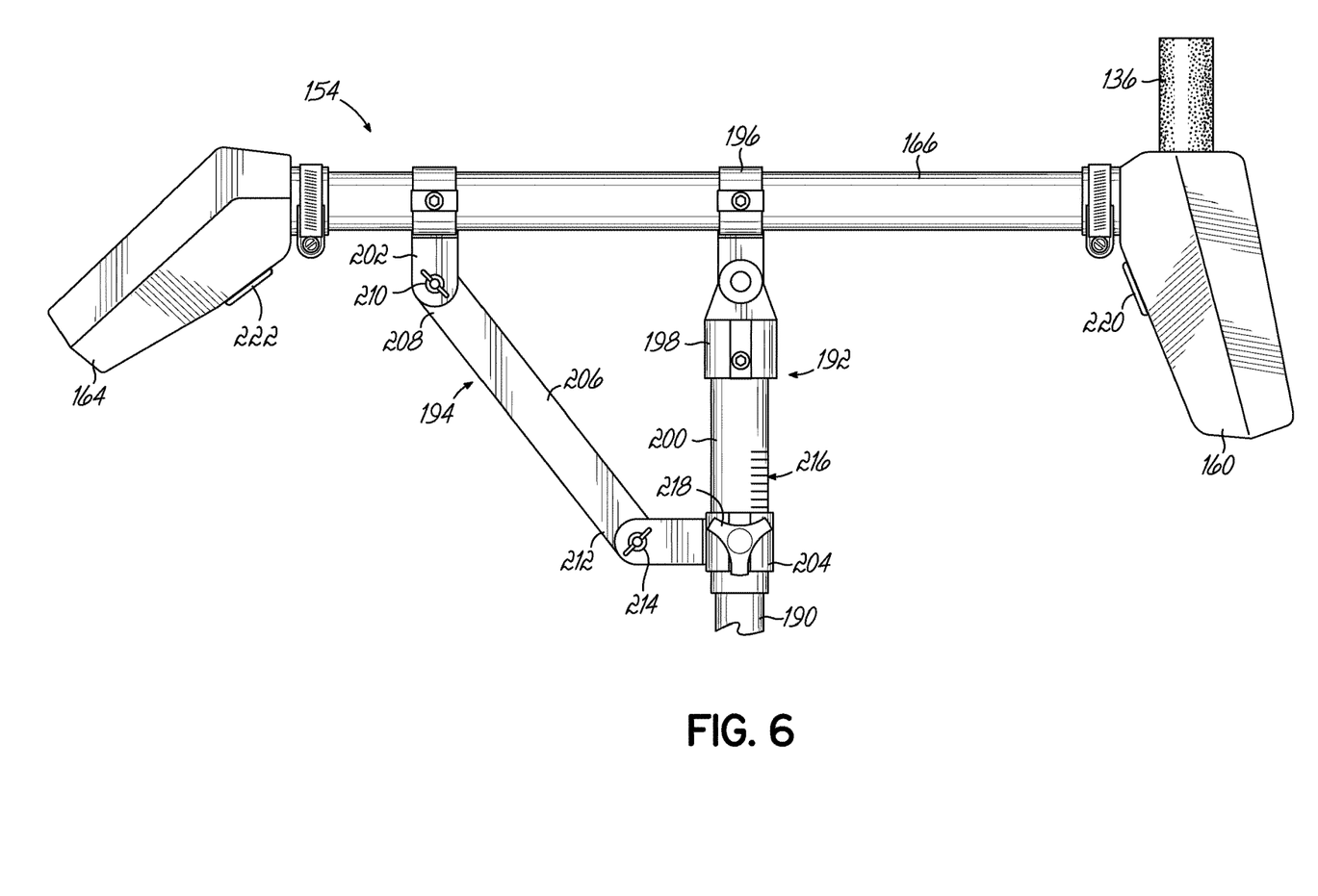
FIG. 6 is a front view of the batting tee assembly of FIGS. 4 and 5 including a mount and an angle adjuster.

FIG. 6 depicts an embodiment of the batting tee assembly 154 that is coupled to a support column 190 by a mount 192 and an angle adjuster 194. The mount 192 may include a central collar 196 that pivotally couples an upper portion 198 of mount 192 to the connecting member 162 of batting tee assembly 154. The mount 192 may include a lower portion 200 configured to removably couple the mount 192 to the support column 190. For example, the lower portion 200 of mount 192 may include a cavity configured to receive a top portion of the support column 190 so that the mount 192 is held in place by friction and/or gravity. The support column 190 may have an adjustable height so that the batting tee assembly 154 can be located a suitable distance above the ground for different batters and types of swings.

The angle adjuster 194 may include a forward collar 202, a mount collar 204, and a link 206 having a distal end 208 that is pivotally coupled to the forward collar 202 by a pivot 210 and a proximal end 212 that is pivotally coupled to the mount collar 204 by a pivot 214. The forward collar 202 and mount collar 204 may be configured to slide along the connecting member 162 and lower portion 200 respectively. As the mount collar 204 is moved along the lower portion 200 of mount 192, the link 206 may transfer this motion to the forward collar 202. In response, the forward collar 202 may urge the batting tee assembly 154 into an angle relative to the mount 192, with the angle being dependent on the position of the mount collar 204 along the lower portion 200 of the mount 192.

To take advantage of this feature, the lower portion 200 of mount 192 may include a graduated scale 216 that provides an indication of the angle at which the batting tee assembly 154 is oriented based on the position of the mount collar 204. When the batting tee assembly 154 is oriented to the desired angle, a clamping mechanism 218 may be tightened so that the mount collar 204 is held in place on the lower portion 200 of mount 192, thereby locking the batting tee assembly 154 into place. In an embodiment of the invention, the angle adjuster 194 may be configured so that the batting tee assembly 154 can be adjusted to any angle between 0 and 15 degrees from the horizontal.

The bat speed radar device 156 and exit velocity radar device 159 may each include a respective indication/activation device 220, 222, such as an illuminated pushbutton switch. Each of the indication/activation devices 220, 222 may protrude from or otherwise be accessible through a corresponding opening in the bat speed radar housing 157 and exit velocity radar housing 160, respectively. The indication/activation devices 220, 222 may enable a user to activate the corresponding radar device (e.g., by pressing the device), and may provide an indication of the operating status of the corresponding radar device. For example, the indication/activation devices 220, 222 may flash in a particular sequence or with a particular duration to indicate the corresponding radar device is powered on, is attempting to link to or pair with a computing device, is connected to a battery that is low on power, or is in any other state that might be useful to communicate to the user.

Figure 7:
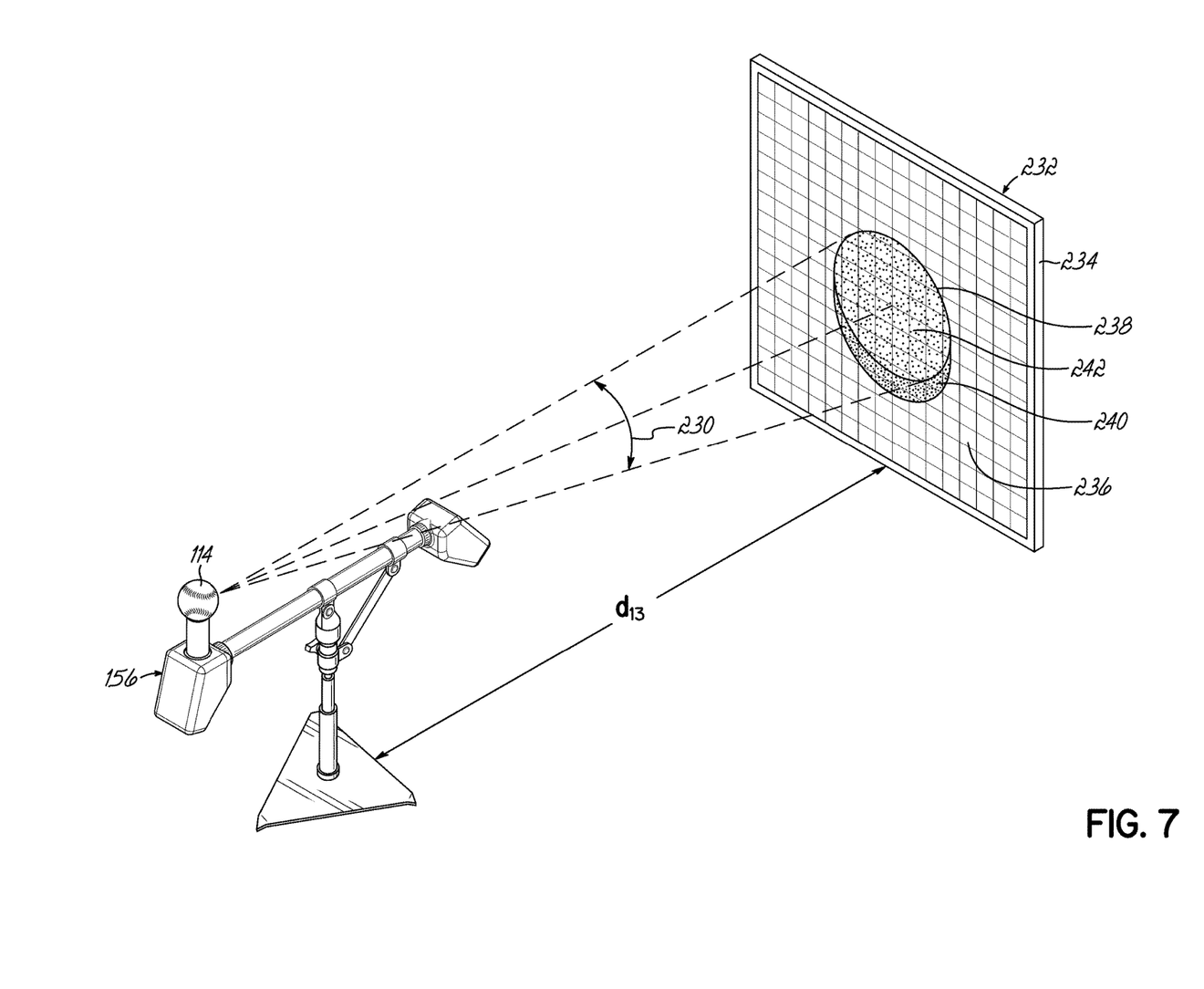
FIG. 7 is a perspective view of the batting tee assembly of FIGS. 4-6 being used with a ball trap for catching struck balls.

Referring now to FIG. 7, the exit velocity radar device 159 may have an operational field of view 230 within which the instrumented batting system 102 is configured to provide accurate and consistent swing metric data. For example, the dimensions, angles, and calibration features of the various components of the instrumented batting system 102 may be selected so that the exit velocity of a ball 114 having a flight path that falls within the operational field of view 230 of exit velocity radar device 159 is accurately measured. One application for the instrumented batting system 102 may be to teach batters how to hit hard line drives. Because hard line drives will quickly clear the batting tee assembly 154, it may be difficult for the batter 104 to positively determine if the flight path of the ball 114 was within operational field of view of the exit velocity radar device 159, and thus whether the system has produced an accurate exit speed reading.

To provide a visual indication of when the flight path of a ball is within the operational field of view 230, a ball trap 232 may be used with the batting tee assembly 154. The ball trap 232 may be configured to provide the batter 104 with additional visual feedback regarding whether the flight path of a struck ball is within the operational field of view 230 of the exit velocity radar device 159. The ball trap 232 may include a frame 234 and a netting material 236 that is positioned across the frame 234 so that struck balls 114 are impeded from passing through the frame 234. The netting material 236 may include an opening 238 having a perimeter to which a pocket 240 is attached. The pocket 240 may be configured to provide a target region 242 and capture balls 114 driven into a central portion of the netting 236. A ribbon or some other material that is visible from the location of the batter 104 may be used to outline the perimeter of opening 238. This may provide the batter 104 with a clear view of the target region 242 at which to aim when hitting balls 114 off the batting tee assembly 154.

To provide an indication of whether the flight path was within the operational field of view 230, the target region 242 may be sized to coincide with the operational field of view 230 when the ball trap 232 is placed a predetermined distance $d_{13}$ from the batting tee assembly 256. In an embodiment of the invention, the target region 242 may comprise a generally circular area having a diameter of between 18 and 28 inches (e.g., about 23 inches), and the distance $d_{13}$ may be between 4 and 6 feet (e.g., about 5 feet). These dimensions may correspond to an operational field of view 230 of about 20 degrees.

The ball trap 232 may provide a visual indication to the batter 104 that the flight path of a struck ball was within the operational field of view 230 if the ball 114 is captured by the pocket 240. In an alternative embodiment, a sensor (not shown) may be coupled to the ball trap 232 and/or pocket 240 to detect if a struck ball hit the target region 242, and communicate this information to the instrumented batting system 102. This may enable the instrumented batting system 102 to provide an indication of how accurate the swing metric measurements are, or even suppress the display of measurements for balls hit outside of the target region 242.

In an embodiment of the invention, the angle adjuster 194 may allow the batting tee assembly 154 to be adjusted for ball trajectories ranging from zero degrees to fifteen degrees above horizontal. The operational field of view 230 may allow the angular coverage of the exit velocity radar device 159 to be expanded by about another seven degrees. However, most high school age, college and professional players prefer a nominal swing angle of eight to ten degrees for hard line drives.

Figure 8:
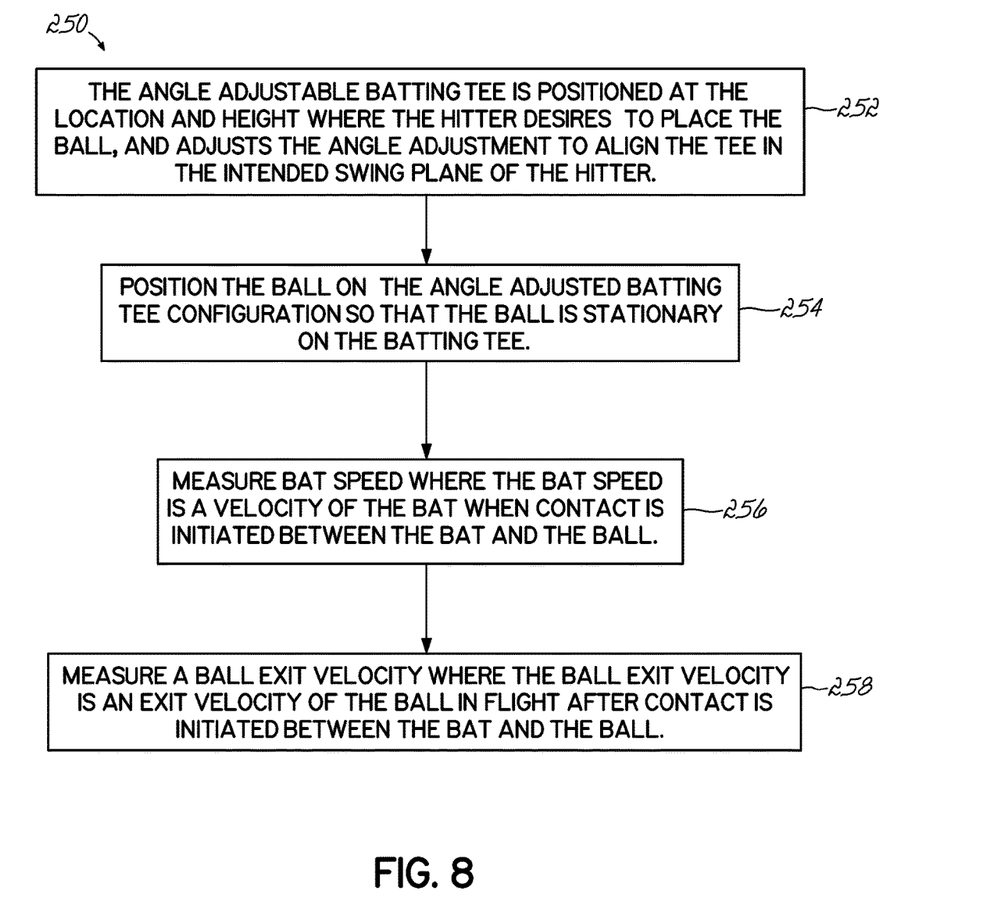
FIG. 8 is a flow chart depicting an exemplary process for using the instrumented batting system.

FIG. 8 is a flowchart depicting an exemplary process 250 that may be used with the instrumented batting system 102 according to an embodiment of the invention. At step 252, the batting tee assembly 110, 130, 154 is positioned at the location and height where the batter desires to place the ball 114. The angle adjuster 138, 194 may be adjusted to align the batting tee assembly 110, 130, 154 with the intended swing plane of the batter 104.

At step 254, the ball 114 may be positioned on the batting tee assembly 110, 130, 154. At step 256, the instrumented batting system 102 measures the bat speed when contact is initiated between the bat 112 and the ball 114. For example, the bat speed radar device 132, 156 may be coupled to the batting tee assembly 110, 130, 154 and positioned proximate to the ball 114 positioned on the batting tee assembly 110, 130, 154. The bat speed radar device 132, 156 may be considered to be proximate to the ball 114 when the bat speed radar device 132, 156 adequately measures the speed of the bat 112 when contact is initiated between the bat 112 and the ball 114.

At step 256, the process 250 may measure an exit velocity where the exit velocity is an exit velocity of the ball in-flight after contact is initiated between the bat 112 and the ball 114. For example, an exit velocity radar device 134, 159 may be coupled to the batting tee assembly 110, 130, 154 and positioned within proximity of a flight path 148 of the ball 114. The exit velocity radar device 134, 159 is considered to be proximate to the ball 114 when the exit velocity radar 134, 159 adequately measures the exit velocity of the ball 114 when the ball 114 travels along the flight path 148.

Figure 9:
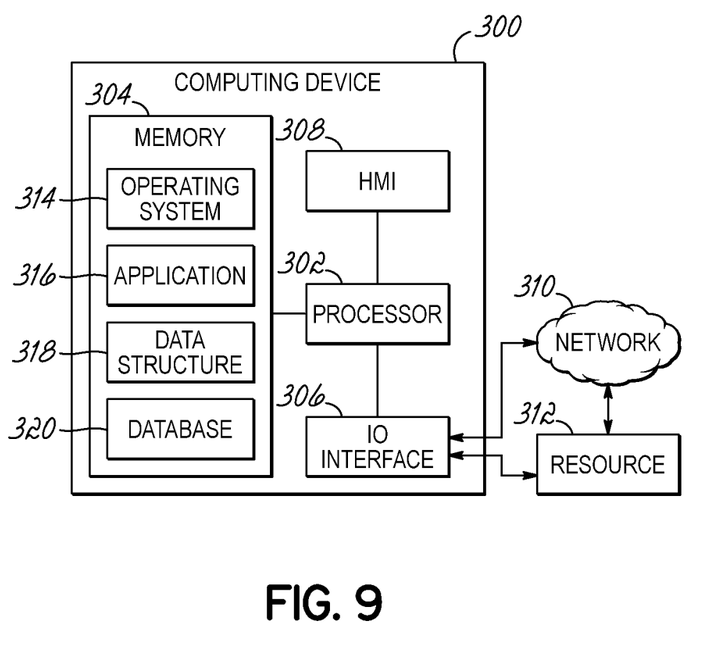
FIG. 9 is a diagrammatic view of an exemplary computer that may be used to implement certain features of embodiments of the invention.

Referring now to FIG. 9, embodiments of the invention described above, or portions thereof, may be implemented using one or more computer devices or systems, such as exemplary computer 300. The computer 300 may include a processor 302, a memory 304, an input/output (I/O) interface 306, and a Human Machine Interface (HMI) 308. The computer 300 may also be operatively coupled to one or more external resources 310 via the network 312 and/or I/O interface 306. External resources may include, but are not limited to, additional computing devices, servers, databases, mass storage devices, peripheral devices, cloud-based network services, or any other resource that may be used by the computer 300.

The processor 302 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 304. Memory 304 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 302 may operate under the control of an operating system 314 that resides in memory 304. The operating system 314 may manage computer resources so that computer program code embodied as one or more computer software applications, such as an application 316 residing in memory 304, may have instructions executed by the processor 302. In an alternative embodiment, the processor 302 may execute the application 316 directly, in which case the operating system 314 may be omitted. One or more data structures 318 may also reside in memory 304, and may be used by the processor 302, operating system 314, or application 316 to store or manipulate data.

The I/O interface 306 may provide a machine interface that operatively couples the processor 302 to other devices and systems, such as the external resource 310 or the network 312. The application 316 may thereby work cooperatively with the external resource 310 and/or network 312 by communicating via the I/O interface 306 to provide the various features, functions, applications, processes, and/or modules comprising embodiments of the invention. The application 316 may also have program code that is executed by one or more external resources 310, or otherwise rely on functions or signals provided by other system or network components external to the computer 300. Indeed, given the nearly endless hardware and software configurations possible, persons having ordinary skill in the art will understand that embodiments of the invention may include applications that are located externally to the computer 300, distributed among multiple computers or other external resources 310, or provided by computing resources (hardware and software) that are provided as a service over the network 312, such as a cloud computing service.

The HMI 308 may be operatively coupled to the processor 302 of computer 300 in a known manner to allow a user to interact directly with the computer 300. The HMI 308 may include video or alphanumeric displays, a touch screen, a speaker, and any other suitable audio and visual indicators capable of providing data to the user. The HMI 308 may also include input devices and controls such as an alphanumeric keyboard, a pointing device, keypads, pushbuttons, control knobs, microphones, etc., capable of accepting commands or input from the user and transmitting the entered input to the processor 302.

A database 320 may reside in memory 304, and may be used to collect and organize data used by the various systems and modules described herein. The database 320 may include data and supporting data structures that store and organize the data. In particular, the database 320 may be arranged with any database organization or structure including, but not limited to, a relational database, a hierarchical database, a network database, or combinations thereof. A database management system in the form of a computer software application executing as instructions on the processor 302 may be used to access the information or data stored in records of the database 320 in response to a query, where a query may be dynamically determined and executed by the operating system 314, other applications 316, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A batting system comprising:
   a batting tee assembly that includes:
   a ball rest having a top configured to hold a ball in a stationary position;
   a first radar device having a first emission point located below the top of the ball rest and configured to emit a first radar beam having a first radar vector from the first emission point; and
   a second radar device having a second emission point located below the top of the ball rest, the second radar device configured to emit a second radar beam having a second radar vector from the second emission point, the second radar vector being oriented in a different direction than the first radar vector,
   the second radar device being offset horizontally from the first radar device so that a horizontal distance between the second radar device and the ball rest is greater than the horizontal distance between the first radar device and the ball rest.

2. The batting system of claim 1 wherein an angle between the first radar vector and the second radar vector is between 20 and 180 degrees, and the angle between the first radar vector and the second radar vector is at 180 degrees when the first radar vector and the second radar vector are directed away from one another in opposite directions.

3. The batting system of claim 1 wherein:
   the ball rest includes a centerline that is generally coincident with a vertical axis of a coordinate system having a horizontal axis orthogonal to the vertical axis and a lateral axis orthogonal to the vertical axis and the horizontal axis;
   the first radar vector is directed generally away from the second radar device and is oriented at an angle of between 0 and 30 degrees above the horizontal axis of the coordinate system; and
   the second radar vector is directed generally away from the first radar device and is oriented at an angle of between 25 and 55 degrees above the horizontal axis.

4. The batting system of claim 1 wherein:
   the first radar device is configured to measure a bat speed and transmit the bat speed via a first communications signal, and
   the second radar device is configured to measure an exit velocity and transmit the exit velocity to via a second communications signal.

5. The batting system of claim 4 further comprising:
   a computing device configured to receive the first communications signal and the second communications signal and display at least one of the bat speed and the exit velocity.

6. The batting system of claim 5 wherein the computing device is further configured to determine a batting metric using at least one of the bat speed and the exit velocity.

7. The batting system of claim 6 wherein the batting metric is a conversion factor, and the computing device is further configured to display the conversion factor.

8. The batting system of claim 1 further comprising:
   a connecting member that couples the first radar device to the second radar device;
   a mount pivotally coupled to the connecting member; and
   an angle adjuster pivotally coupled to the connecting member and the mount, the angle adjuster configured to adjust an angle of the connecting member relative to the mount.

9. The batting system of claim 8 wherein the angle adjuster includes:

a link having a proximal end and a distal end;
first collar that slidably couples to the distal end of the link to the connecting member;
a second collar that slidably couples the proximal end of the link to the connecting member; and
a clamping mechanism that permits movement of the second collar along the mount in a first user selectable state, and resists movement of the second collar along the mount in a second user selectable state.

10. The batting system of claim 1 wherein the second radar device has an operational field of view, and further comprising:
a ball capturing apparatus including a target region having an area that coincides with the operational field of view when the ball capturing apparatus is placed a predetermined distance from the second radar device.

11. A batting system comprising:
a ball rest configured to hold a ball in a stationary position within a swing plane of a batter, the ball rest having a center line coincident with a vertical axis of a coordinate system having a horizontal axis orthogonal to the vertical axis, and a lateral axis orthogonal to the vertical axis and the horizontal axis, so that a plane defined by the horizontal axis and the lateral axis is generally parallel to the swing plane;
a first radar device having a first emission point located below the swing plane and configured to emit a first radar beam having first radar vector from the first emission point, the first radar vector being directed upward at an angle of between 0 and 80 degrees relative to the horizontal axis and generally toward an expected position of the batter; and
a second radar device offset horizontally from the first radar device away from the expected position of the batter, the second radar device having a second emission point located below the swing plane and configured to emit a second radar beam having second radar vector from the second emission point, the second radar vector being directed upward at an angle of between 0 and 80 degrees relative to the horizontal axis and away from the first radar vector.

12. The batting system of claim 11 wherein a horizontal distance between the second radar device and the ball rest is greater than the horizontal distance between the first radar device and the ball rest.

13. The batting system of claim 11 further comprising:
a processor; and
a memory including program code that, when executed by the processor, causes the processor to:
receive a first communications signal from the first radar device;
receive a second communications signal from the second radar device;
determine a bat speed based on the first communications signal; and
determine an exit velocity based on the second communications signal.

14. The batting system of claim 13 wherein the program code further causes the processor to:
determine a conversion factor equal to a ratio of the exit velocity to the bat speed.

15. The batting system of claim 14 further comprising a display coupled to the processor, wherein the program code further causes the processor to:
display at least one of the bat speed, the exit velocity, and the conversion factor on the display.

16. The batting system of claim 13 further comprising a wireless receiver coupled to the processor, wherein at least one of the first communications signal and the second communications signal is received via the wireless receiver.

17. The batting system of claim 13 wherein the program code further causes the processor to determine the exit velocity based on the second communications signal by:
extracting a measured exit velocity from the second communications signal; and
applying a correction factor to the measured exit velocity to generate a corrected exit velocity; and
setting the exit velocity equal to the corrected exit velocity.

18. A method of determining and displaying a swing metric, the method comprising:
holding a ball in a stationary position within a swing plane of a batter along a center line coincident with a vertical axis of a coordinate system having a horizontal axis orthogonal to the vertical axis, and a lateral axis orthogonal to the vertical axis and the horizontal axis, so that a plane defined by the horizontal axis and the lateral axis is generally parallel to the swing plane;
emitting a first radar beam having first radar vector from a first emission point located below the swing plane, the first radar vector being directed upward at an angle of between 0 and 80 degrees relative to the horizontal axis and generally toward an expected position of the batter; and
emitting a second radar beam having second radar vector from a second emission point located below the swing plane, the second radar vector being directed upward at an angle of between 0 and 80 degrees relative to the horizontal axis and away from the first radar vector, the second emission point being offset horizontally from the first emission point and away from the expected position of the batter.

19. The method of 18 further comprising:
determining a bat speed using the first radar beam;
determining an exit velocity using the second radar beam; and
determining a conversion factor equal to a ratio of the exit velocity to the bat speed.

20. The method of claim 19 further comprising:
displaying at least one of the bat speed, the exit velocity, and the conversion factor.

* * * * *

UNITED STATES PATENT AND TRADEMARK OFFICE
CERTIFICATE OF CORRECTION

PATENT NO. : 10,478,695 B2
APPLICATION NO. : 16/008106
DATED : November 19, 2019
INVENTOR(S) : Albert E. Dilz, Jr.

It is certified that error appears in the above-identified patent and that said Letters Patent is hereby corrected as shown below:

In the Specification

Column 3, Line 24, change "perfecting the mechanics of their a swing" to --perfecting the mechanics of their swing--.

Column 6, Line 10, change "to produce well hit balls" to --to produce well-hit balls--.

Column 6, Line 41, change "where Q is a collision factor of a well struck ball from an" to --where Q is a collision factor of a well-struck ball from an--.

Column 7, Line 51, change "134 may positioned the distance $d_1$ from" to --134 may be positioned the distance $d_1$ from--.

Column 7, Line 67, change "before the exit velocity has decrease significantly from" to --before the exit velocity has decreased significantly from--.

Column 8, Line 57, change "a well struck ball 114 after the" to --a well-struck ball 114 after the--.

Column 8, Line 59, change "150 corresponds to the direction of motion of a well struck" to --150 corresponds to the direction of motion of a well-struck--.

Column 10, Line 23, change "each of the housings 157, 160 are coupled" to --each of the housings 157, 160 is coupled--.

Column 10, Lines 52-53, change "urge the interior service of the flanges 178, 179" to --urge the interior surface of the flanges 178, 179--.

Column 12, Line 10, change "suppose a batter as a swing speed of 70 miles per" to --suppose a batter has a swing speed of 70 miles per--.

Signed and Sealed this
Eleventh Day of February, 2020

Andrei Iancu
*Director of the United States Patent and Trademark Office*

CERTIFICATE OF CORRECTION (continued)
U.S. Pat. No. 10,478,695 B2

In the Claims

Column 18, Lines 44-45, Claim 4, change "the second radar device is configured to measure an exit velocity and transmit the exit velocity to via a second" to --the second radar device is configured to measure an exit velocity and transmit the exit velocity via a second--.

Column 19, Lines 2-3, Claim 9, change "first collar that slidably couples to the distal end of the line to the connecting member;" to --a first collar that slidably couples the distal end of the link to the connecting member;--.

Column 20, Line 46, Claim 19, change "The method of 18 further comprising:" to --The method of claim 18 further comprising:--.